Oct. 21, 1941.  H. P. SMITH  2,259,864
IMPLEMENT ATTACHMENT FOR TRACTORS
Filed July 10, 1940  2 Sheets-Sheet 1

Inventor
H. P. Smith
By Paul O Pippel
Atty.

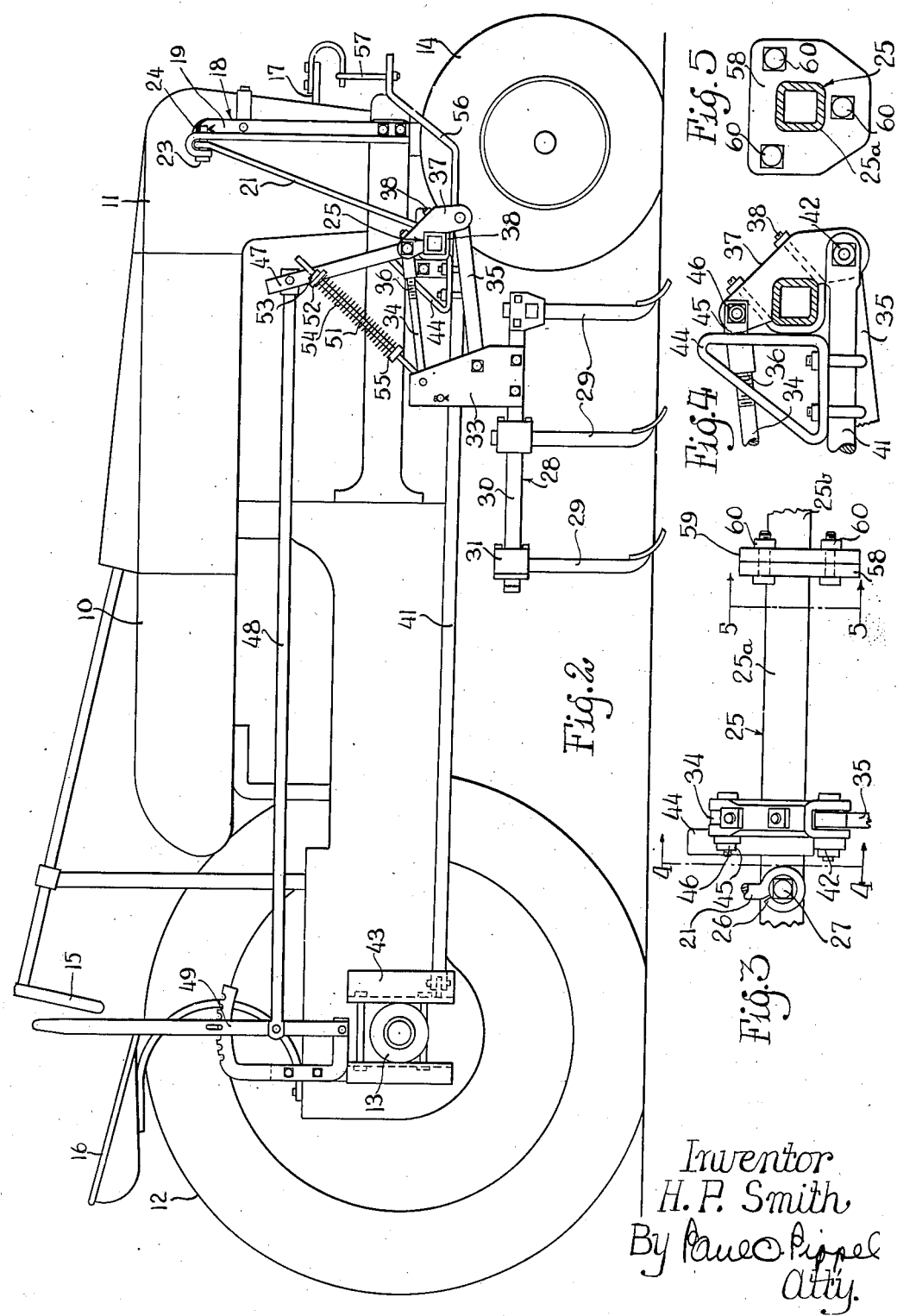

Patented Oct. 21, 1941

2,259,864

UNITED STATES PATENT OFFICE 2,259,864

IMPLEMENT ATTACHMENT FOR TRACTORS

Hiram P. Smith, Canton, Ill., assignor to International Harvester Company, a corporation of New Jersey Application July 10, 1940, Serial No. 344,744

7 Claims. (Cl. 97—47)

This invention relates to implement attachments, and more particularly to implement attachments of the type adapted to be moved laterally upon the steering of the tractor to effect in the case of cultivation of row crops means for dodging the plants.

With cultivators of the plant dodging type used heretofore, the supporting structure has been located ahead of the tractor steerable wheels making necessary the use of connecting parallel links for the attachment of cultivator rigs thereto to be unnecessarily lengthy. This is necessary because the rigs had to be located in rear of the steerable wheel of the tractor, and at the same time connection is to be made with the rig supporting structure at a location ahead of the axis of the steerable wheel of the tractor.

It is, therefore, the principal object of the invention to provide a shifting frame cultivator wherein the means for connecting the rigs to the supporting structure need only to be of minimum length.

It is another object of the invention to provide in a shifting frame cultivator of this type a rig supporting means which is separable in two parts to permit its removal readily from its location underneath the tractor.

According to the present invention the rig supporting means which was used heretofore in a location ahead of the axis of the steerable wheels is now located rearwardly of the axis of the steerable wheel and connected to the forward portion of the tractor for lateral shifting movement. This shifting movement is given to the rig supporting means by the steering mechanism of the tractor intermediate the ends of the rig supporting structure. The rig supporting structure is made in two parts so that it may be separated for easy removal of the same from underneath the tractor. The cultivating rigs may be connected to the rig supporting means by the same means used heretofore but since the rig supporting means is not located so far ahead on the tractor, this means for connecting the rigs to the rig-supporting means is of shorter extent.

For other objects and for a better understanding of the invention, reference may be had to the following detailed description taken in connection with the accompanying drawings, in which:

Figure 2 is a side elevational view of a tractor and of the implement attachment;

Figure 3 is a detail view in elevation of a portion of the rig-supporting structure;

Figure 4 is a view taken along the lines 4—4 of Figure 3 illustrating the connection of the thrust members through the rig-supporting structure; and, Figure 5 is a view in elevation taken along the lines 5—5 of Figure 3 and illustrating the flange plate connections intermediate the ends of the rig-supporting structure.

Figure 1:
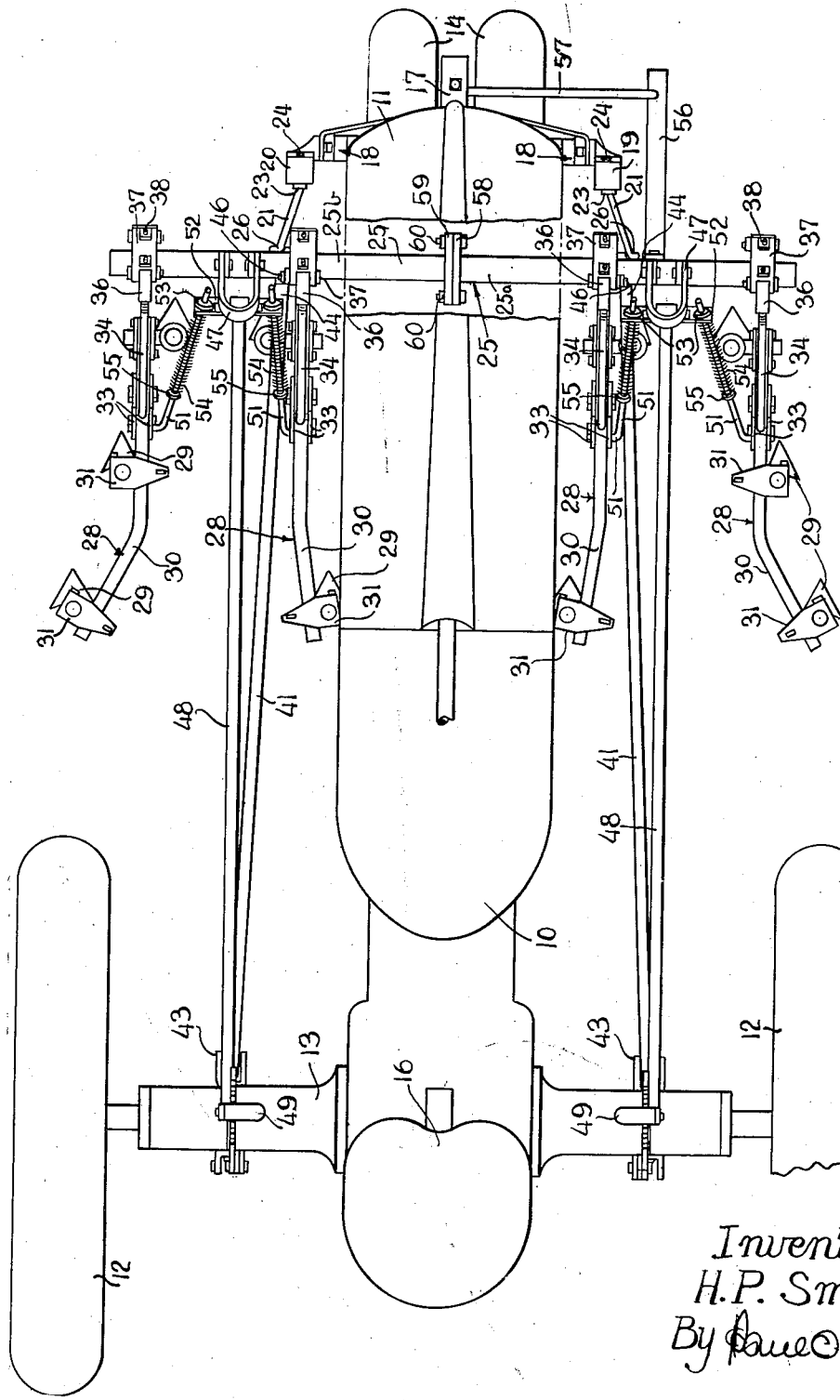
Figure 1 is a plan view of the tractor with the implement attachment of the present invention associated with it.

Referring now to the figures, there is shown a tractor 10 having a forward portion 11 and a rear axle structure 13 carried by wheels 12. Associated with the forward portion of the tractor are steerable wheels 14 adapted to be controlled from the steerable hand wheel 15 located proximate the operator's station 16 on the rear axle structure of the tractor. It should be apparent that the steerable wheels 14 are free to be operated by the hand wheel 15 to effect steering movement of the tractor. Associated with the steering mechanism and adapted to be given lateral movement thereby is a forwardly extending part 17. This part 17 is automatically made movable by the steering wheels 14 upon the same being operated.

On the forward portion 11 of the tractor is a vertically extending bracket structure 18 including two vertically extending members 19 and 20 fixed to the tractor and having their ends formed respectively to receive for lateral pivotal movement the supporting links 21. The upper ends of the vertical members 19 may be folded rearwardly and downwardly to provide a space into which the upper ends of the links 21 may be nested. Extending through the upper ends and through eye portions formed in the upper ends of the links 21 are retaining bolts 23. These retaining bolts 23 may be removed upon removal of a cotter pin 24 to thereby permit removal of the swinging links 21 from their connection with the bracket structure 18.

These supporting links 21 extend rearwardly to a location immediately in rear of the steerable wheels 14 for their connection with a rig supporting structure 25 extending generally transversely underneath the tractor. The lower ends of the links 21 are formed to provide an eye portion 26 and are thereby attachable to the rig supporting structure by bolt means 27 extending through the eye portions 26 for their connection with the rig supporting structure 25.

It should now be apparent that the rig-supporting structure is free to shift laterally underneath the body part of the tractor.

This rig-supporting structure 25 extends laterally to some extent from the sides of the tractor to have connected thereto the cultivating rigs 28. There may be a set of these cultivator rigs at each side of the tractor when the cultivator is to be used for the cultivation of two crop rows. Each cultivator rig 28 includes cultivating tools 29 fixed to a rig beam 30 by the usual clamping means 31. The rig structure also includes two vertically extending plate structures 33, and as means for connecting the rig to the rig supporting structure 25 there may be provided a pair of short vertically spaced connecting links 34 and 35. The upper link 34 may be adjustable as indicated at 36. On the rig-supporting means 25 is a bracket 37 adapted to be rigidly secured to the rig-supporting structure 25 by means of a U-bolt clamping means 38. The forward ends of the connecting links 34 and 35 are pivotally connected to this bracket 37 in vertically spaced relation.

During cultivation considerable rearward strain is placed on the rig-supporting structure and means is necessary for maintaining the same in its location immediately in rear of the wheels 14. This may be accomplished by thrust members 41 pivotally connected to the lower ends of the bracket structure 37 as is illustrated more clearly in Figure 4, and as indicated at 42. The rearward end of the thrust members are pivotally connected to permit lateral movement to a bracket structure 43 secured to the rear axle structure 13 of the tractor. As further means for retaining the rig-supporting structure, there is provided on the forward end of the thrust member 41 a vertically extending bracket 44 having means 45 for connection with the upper part of the bracket structure as indicated at 46.

Any of the usual lifting means may be provided for effecting the raising of the cultivating rigs to their transport position. The form shown herein includes a lifting lever 47 pivoted at its lower end to a bracket 37 and adapted to swing in a fore and aft direction along the side of the tractor. The upper end of the lever 47 may be connected to a lifting pipe 48 adapted to be operated by a manual adjustment mechanism 49. The lifting unit 47 is then connected by means of lift rods 51 with the plate structure 33 of the rig. As the lever 47 is moved forwardly by means of adjusting mechanism 49, a laterally extending plate 52 integral with the lifting lever 47 will abut a collar 53 rigid with the lift rod 51 to thereby effect lifting movement to the latter. A pressure spring 54 may be provided on the lifting rod 51 and adapted to engage an adjustable collar 55 and to react against the plate 52 to supply spring pressure to the cultivating rig 30.

In order to effect lateral steering movement of the rig structure 25, there is connected between this rig structure and the projecting portion 17 of the steering mechanism, connecting means 56 extending forwardly from the rig-supporting structure 25 and having a member 57 for connection with the projecting part 17. When the steering mechanism is operated it will be apparent that the rig-supporting structure will likewise be operated and be moved laterally to thereby provide for plant dodging of the plants being cultivated. It should further be apparent that by so moving the rigs rearwardly of the links 14, the links 34 and 35 need not necessarily be of such length as would be required when the rig-supporting structure 24 is located ahead of the steerable wheel 14.

Since the rig-supporting structure is of considerable length and rather inconvenient for easy removal from underneath the tractor as a unit, means has been provided according to the present invention wherein the same may be separable into two parts, each part being removable respectively from the respective sides of the tractor. The rig-supporting structure 25 may therefore include two parts 25a and 25b. On the inner end of these parts are welded respectively flange plates 58 and 59. Each of these flange plates may have openings therethrough for the passage of clamping bolt means 60 to effect clamping of the two parts 25a and 25b together. There may be three of these bolt means 60 angularly spaced about the spaced flange parts.

It should now be apparent that a shifting frame cultivator has been provided wherein the rig-supporting structure need not be located ahead of the steerable wheel so that unduly long connecting links need be employed for the connection of the cultivator rigs to the same. It should also be apparent that means has been provided in the present type of cultivator attachment wherein the same may be readily removed from the tractor without the necessity of removing the entire rig structure from the tractor as a unit.

While various changes may be made in the detail construction of the present invention, it shall be understood that such changes shall be within the spirit and scope of the present invention as defined in the appended claims.

What is claimed is:

1. In combination with a tractor having a longitudinally extending body portion, an implement supporting means adapted to be mounted on the tractor, said means comprising a member disconnectable intermediate its ends into separate members, said members adapted to be disposed transversely across the forward end of, and below the tractor body, and a rearwardly extending thrust member connected to each of the separate members by a vertical pivot, said thrust members adapted to be connected to the tractor.

2. The combination with a tractor having a longitudinally extending body, forward and rearward tractor wheels for supporting the longitudinally extending body, an implement supporting means adapted to be mounted on the tractor comprising a member adapted to be disposed transversely across the forward end of and below the tractor body intermediate the forward and rearward tractor wheels, said member being laterally movable with respect to the tractor, and thrust members connected to the member on a vertical pivot and extending rearwardly thereof and adapted to be connected to the rear of the tractor.

3. In combination, a tractor having steering mechanism, supporting bracket structure on the tractor, rig supporting means extending transversely underneath the tractor, means for connecting the rig supporting means to the bracket structure for lateral adjustment relative thereto, means for connecting the steering mechanism to the rig supporting means to effect lateral adjustment of the same during operation of the tractor, cultivating rigs connected to the rig supporting means, and said rig supporting means being separable into two parts for the removal of the same from the tractor.

4. In combination, a tractor having a forward portion, steering mechanism including parts associated with the forward portion of the tractor, a rig supporting structure adapted to extend transversely under the forward portion of the tractor, means for connecting the rig supporting structure to the forward portion of the tractor for lateral movement, means for connecting the steering mechanism to the rig supporting means to laterally move the same, cultivating rigs and means for connecting the same to the rig supporting structure to extend along the sides of the tractor and immediately in rear of the supporting structure, and said rig supporting structure being separable into two parts for the removal of the same from the tractor.

5. In combination, a tractor having forward and rearward supporting wheels, tool-supporting means extending transversely underneath the tractor between the forward and rearward supporting wheels, means for connecting the tool-supporting means to the tractor for lateral movement with respect thereto, working tools connected to the tool-supporting means, and said tool-supporting means being separable into two parts for the removal of the same from underneath the tractor.

6. In combination, a tractor having forward and rearward supporting wheels, tool-supporting means extending transversely underneath the tractor between the forward and rearward supporting wheels, means for connecting the tool-supporting means to the tractor, said tool-supporting means being separable into two parts for the removal of the same from underneath the tractor, means for connecting the two together including vertically extending portions respectively rigidly secured to the respective parts, and means for connecting the portion of one part to the portion of the other part.

7. In combination, a tractor having forward and rearward supporting wheels, tool-supporting means extending transversely underneath the tractor between the forward and rearward supporting wheels, means for connecting the tool-supporting means to the tractor, said tool-supporting means being separable into two parts for the removal of the same from underneath the tractor, each of said parts having a vertically extending flanged plate on an inner end of the part, said plates being disposed adjacent each other upon assembling the parts, and means for securing the plates together.

HIRAM P. SMITH.